US006961425B2

(12) United States Patent
August

(10) Patent No.: US 6,961,425 B2
(45) Date of Patent: Nov. 1, 2005

(54) SOCKET/PLUG IN DTMF TONE DIALER

(76) Inventor: Clifford J. August, 20 West 18th Ave., Vancouver B.C. (CA), V5Y 2A4

( * ) Notice: Subject to any disclaimer, the term of this patent is extended or adjusted under 35 U.S.C. 154(b) by 294 days.

(21) Appl. No.: 10/329,128

(22) Filed: Dec. 24, 2002

(65) Prior Publication Data

US 2003/0152217 A1 Aug. 14, 2003

Related U.S. Application Data

(63) Continuation-in-part of application No. 10/236,251, filed on Sep. 4, 2002.

(60) Provisional application No. 60/342,080, filed on Dec. 26, 2001, and provisional application No. 60/316,913, filed on Sep. 4, 2001.

(51) Int. Cl.[7] .................................................. H04M 3/00

(52) U.S. Cl. .............. 379/418; 379/355.01; 379/355.06

(58) Field of Search ............................ 379/418, 355.01, 379/355.06

(56) References Cited

U.S. PATENT DOCUMENTS

| | | | |
|---|---|---|---|
| 4,103,115 A | | 7/1978 | Milkes |
| 4,980,910 A | | 12/1990 | Oba et al. |
| 5,583,919 A | | 12/1996 | Talvard et al. |
| 5,583,933 A | * | 12/1996 | Mark .................... 379/357.04 |
| 5,859,896 A | | 1/1999 | Rosen |
| 5,901,217 A | | 5/1999 | Kanbar |
| 6,049,604 A | | 4/2000 | Lin |
| 6,118,867 A | | 9/2000 | Ban |
| 6,169,799 B1 | | 1/2001 | McIntosh |
| 6,240,175 B1 | | 5/2001 | Barber |

FOREIGN PATENT DOCUMENTS

| | | |
|---|---|---|
| CA | 2231006 | 3/1997 |

* cited by examiner

*Primary Examiner*—Jefferey F. Harold
(74) *Attorney, Agent, or Firm*—Michael R. Schacht; Schacht Law Office, Inc.

(57) ABSTRACT

A system for generating number tones for dialing a telephone device. The system comprises a socket assembly, at least one button assembly, and a converter. The socket assembly defines at least one socket. Each button assembly comprises a memory device for storing a sequence of numbers and a switch device. The converter generates a DTMF signal comprising a sequence of DTMF tones. Operation of the switch device causes the converter to generate the DTMF signal based on the sequence of numbers stored by the memory device. The socket assembly electrically connects the converter to the telephone device.

13 Claims, 12 Drawing Sheets

SOCKET/PLUG IN DTMF TONE DIALER

RELATED APPLICATIONS

This application claims priority of U.S. Provisional Patent Application Ser. No. 60/342,080, which was filed on Dec. 26, 2001, and is a Continuation-in-Part of U.S. patent application Ser. No. 10/236,251, which was filed on Sep. 4, 2002, and which claimed priority of U.S. Provisional Application Ser. No. 60/316,913 filed on Sep. 4, 2001.

TECHNICAL FIELD

The present invention relates to systems and methods for generating tones that may be processed by conventional telephone switching equipment and, more specifically, to external tone generators that may be attached to conventional telephones.

BACKGROUND OF THE INVENTION

Telephony equipment is commonly used to establish voice and data communications between served locations over a telephone network. Typically, the voice and data are transmitted between served locations through one or more central offices. Telephony equipment located at a central office will be referred to herein as switching equipment. Telephony equipment located at a served location will be referred to herein as a telephone device. A telephone device can be any device capable of communicating over the telephony network; telephone devices include analog telephones, PBX systems, digital telephone systems, computers, facsimile machines, and the like.

The present invention relates primarily to telephone devices used to establish voice communications over a telephone network, and that application will be described in detail below. A voice telephone typically includes a keypad and electronics for generating tones based on entries made on the keypad. When a connection is to be established between a source telephone and a destination telephone, the number of the destination telephone is entered using the keypad. The source telephone transmits the number of the destination telephone to the switching equipment at the central office as a sequence of tones. The switching equipment converts the sequence of tones into the destination telephone number and establishes an appropriate connection between the source and destination telephones.

To be recognized by the switch equipment, telephone devices typically generate tones referred to as DTMF signals. DTMF signals comprise first and second sine wave signals that are added together. A predetermined DTMF matrix relates the frequencies of the first and second sine wave signals with the numerical value associated with each DTMF signal. The switching equipment filters the DTMF tones to obtain the individual sine wave signals, determines the frequencies of thereof, and looks up the value associated with each DTMF tone in the DTMF matrix.

Conventionally, the frequency of the low frequency signal is one of a first group of four predetermined frequencies, while the frequency of the high frequency signal is one of a second group of four predetermined frequencies. The DTMF signal thus yields sixteen possible combinations of frequency signals. Conventionally, the DTMF signals represent the numerals 0–9, the symbols "*" and "#". The letters A–D are also represented, but conventional telephone keypads do not have keys corresponding to the letters A–D.

Telephone devices such as computers, facsimile machines, and telephones having speed dial can typically be pre-programmed to automatically generate a sequence of DTMF signals without entering in each digit on the keypad. More specifically, speed dial allows the user to associate a longer telephone number with a dedicated button or shorter combination of numbers. Speed dial capable telephone devices often allow the entry of extensions to a particular telephone number with pauses and other commands necessary to establish the desired connection.

However, many existing telephones do not have speed dial. In addition, even if speed dial is available on a given telephone device, many users do not know how or bother to learn how to use the speed dial features. Speed dial features are thus only available to a limited number of customers who use telephone devices.

Within the United States and Canada, telephony switching equipment is programmed to recognize a ten-digit telephone number. The first three digits of the telephone number are referred to as the area code; the last seven digits are referred to as the local portion. Traditionally, area codes have been associated with a geographic local calling area, and served locations within a given local calling area could connect to each other by transmitting either the local number or the digit "1" plus the local number.

Connections between served locations in different local calling areas require the entry of the entire ten-digit telephone number. Traditionally, calls between served locations in different local service areas involved a long distance carrier and associated long distance charges.

Factors such as the proliferation of cellular telephones, facsimile machines, and other telephone devices have depleted the number of local numbers within many area codes. In each situation where the local numbers within an area code have become depleted, the telephone companies have responded in one of two ways.

First, the traditional geographic calling areas have been broken into smaller regions, each of which has been assigned a new area code. This approach requires the purchase of new or updated switching equipment and is relatively expensive for the telephone companies.

The second approach is to create a new area code for the local service area with a shortage of local numbers. This approach is relatively inexpensive for the telephone company. In addition, calls between served locations having different area codes within a local calling area do not involve a long distance carrier; even though the entire ten-digit number is dialed, users are not required to pay long distance charges.

However, overlaying a new area code in an existing local service area requires users to enter the entire ten-digit telephone number even when dialing within the local calling area. As the number of local numbers with the new area code increases, customers will be forced to learn and remember which of two or more area codes are associated with each local number. In addition, customers will be required to enter the extra three digits associated with the area code each time they enter a local phone number.

While telephone devices having speed dial capabilities can lessen the burden of learning, remembering, and using ten-digit numbers for local dialing, these features are not available to many users as described above. Speed dial is thus only a partial answer to the problems associated with using one or more additional area codes in an existing local calling area.

Accordingly, in many cases adding area codes in an existing local calling area increases the burden on the customer and causes increased customer confusion. Telephone customers and regulatory agencies thus tend to resist or prohibit attempts by telephone companies to overlay new area codes in existing local calling areas.

Generally, the need exists for improved systems and methods of providing speed dialing capabilities to more telephone users. More specifically, the need exists for systems and methods that ease the transition to the use of ten digit telephone numbers within local calling areas.

SUMMARY OF THE INVENTION

The present invention is a system for generating number tones for dialing a telephone device. The system comprises a socket assembly, at least one button assembly, and a converter. The socket assembly defines at least one socket. Each button assembly comprises a memory device for storing a sequence of numbers and a switch device. The converter generates a DTMF signal comprising a sequence of DTMF tones. Operation of the switch device causes the converter to generate the DTMF signal based on the sequence of numbers stored by the memory device. The socket assembly electrically connects the converter to the telephone device.

DETAILED DESCRIPTION OF THE INVENTION

Figure 1:
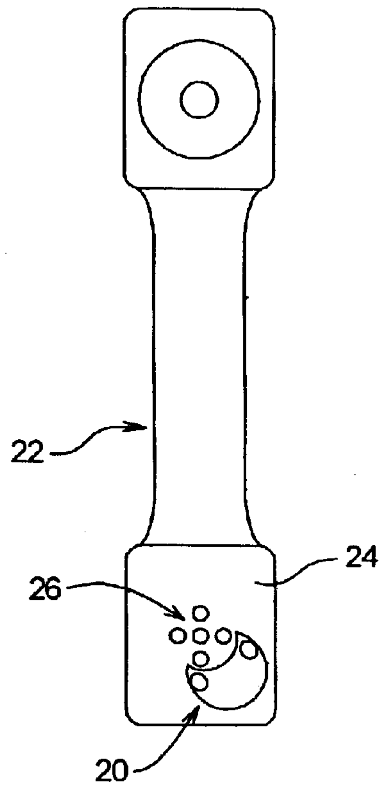
FIG. 1 is a top plan view of a first embodiment of tone generator system of the present invention mounted onto an exemplary telephone handset.

Referring initially to FIG. 1, depicted at 20 therein is a tone generator system constructed in accordance with, and embodying, the principles of the present invention. Also shown in FIG. 1 is a telephone hand set 22 having a mouthpiece 24. Inside the mouthpiece 24 is a microphone 26 schematically depicted in FIG. 1 by five holes in the mouthpiece 24.

The tone generator system 20 is affixed to the mouthpiece 24 of the telephone hand set 22 adjacent to the microphone 26 as shown in FIG. 1. The tone generator system 20 creates tones that are recognizable by a telephone network to which the telephone handset 22 is connected. In particular, conventional telephone networks recognize DTMF signals, and the tone generator system 20 generates audible DTMF signals representing one or more numbers. The location of the tone generator systems 20 next to the microphone 26 allows the microphone to detect the audible DTMF signals and convert these signals into electrical signals that may be processed in a conventional manner by the telephone network.

Figure 2:
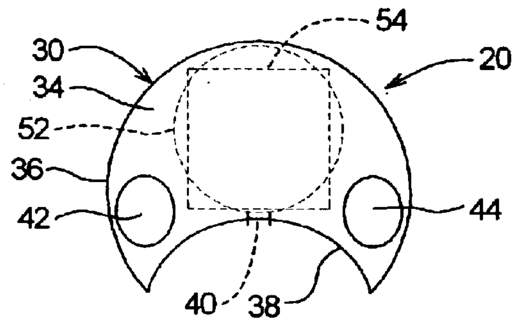
FIG. 2 is a top plan view of the tone generator system of FIG. 1, with phantom lines showing the location of certain elements thereof.
Figure 3:
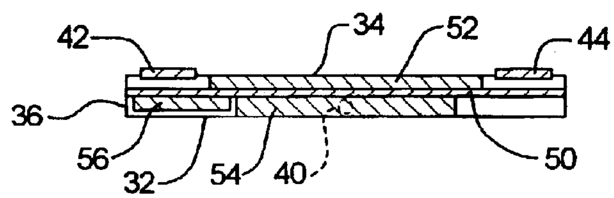
FIG. 3 is a section view of the tone generator system of FIG. 1.
Figure 4:
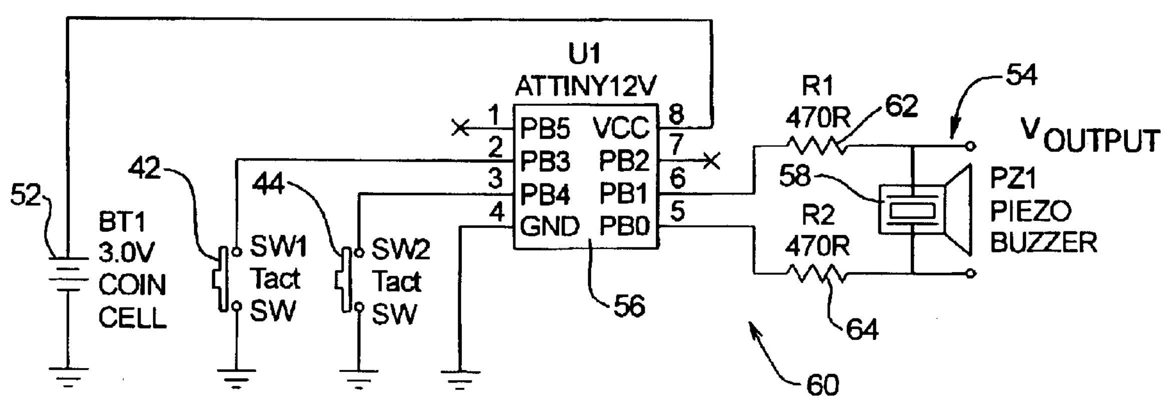
FIG. 4 is a circuit diagram depicting the electrical circuit of the tone generator system of the present invention.

Referring now to FIGS. 2–4, the tone generator system 20 will now be described in further detailed. As shown in FIGS. 2 and 3, the tone generator system 20 comprises a housing 30 having an inner wall 32, an outer wall 34, and first and second edge walls 36 and 38. The inner wall 32 is adapted to be secured to the telephone handset 22. The inner wall 32 to the telephone handset 22 may be any convenient permanent or temporary adhesive such as glue, double-stick tape, hook and loop fastener, and the like. Preferably, the fastening system is formed by double stick tape (not shown) secured to the outer surface of the inner wall 32 at the factory and protected by a release sheet before installation on the handset 22.

A sound opening 40 is formed in the second edge wall 38. In the exemplary tone generator system 20, first and second button assemblies 42 and 44 are mounted to the housing 30 such that the buttons are accessible at the outer wall 34.

FIG. 3 shows that the tone generator system 20 further comprises a printed circuit board 50, a battery 52, a transducer assembly 54, and a processor 56. FIG. 4 additionally shows that the transducer assembly 54 comprises a piezoelectric element 58.

The battery 52, transducer assembly 54, processor 56, and first and second button assemblies 42 and 44 are all mounted to the printed circuit board 50. In addition, shown in FIG. 4 is a circuit 60 illustrating that the printed circuit board 50 contains wiring and additional circuit elements that electrically connect the buttons 42 and 44, battery 52, speaker assembly The buttons 42 and 44 are momentary switches that form first and second input devices for the system 20. In particular, these buttons 42 and 44 exist in a normally open state and, when depressed, are placed into a closed state. With the circuit 60 configured as described above, the processor 56 can detect whether the buttons 42 and/or 44 are in the open or closed states.

The processor 56 is a general-purpose processor capable of storing and running software comprising instructions and data. The exemplary processor 56 is an ATTINY12V processor, but other micro-processors of similar size and processing capacity can be substituted for the exemplary processor 56. In addition, the functions of the ATTINY12V processor and the software running thereon may be reproduced using discrete circuit components.

The exemplary ATTINY12V processor 56 comprises eight pins. The battery 52 is connected across pins 4 (ground) and 8 (power) to provide power to the processor 56. In addition, the processor 56 comprises first, second, and third input pins 1, 2 and 3 and first, second and third output pins 5, 6, and 7. In the system 20, the first and second buttons 42 and 44 are connected to the input pins 2 and 3, respectively. The output pins 5 and 6 are connected to first and second resistors 62 and 64. The piezo-electric element 58 is connected between the resistors 62 and 64. The input pin 1 and output pin 7 are unused in the exemplary circuit 60.

The output pins 5 and 6 of the processor 56 are connected to the piezo-electric element 58 through the resistors 62 and 64, respectively. The exemplary processor 56 is a digital device, and the digital output signal generated by the pins 5 and 6 may only be either HIGH or LOW; however, this digital output signal results in an analog output signal $V_{output}$ across the piezo-electric element 58 as will be described in further detail below.

The software running on the processor comprises at least one and possibly two separate routines. The first routine is referred to as an operational routine. The second routine, if used, is referred to as a programming routine. When the processor 56 is running the operational routine, the system 20 is in an operational mode in which activating one of the buttons 42 or 44 causes the system to generate one or more DTMF tones corresponding to one or more digit sequences. When the processor 56 is running the programming routine, the systems 20 is in a programming mode in which the stored digit sequences may be changed.

In the system 20 described herein, the digit sequences are three numbers long and represent an area code. In addition, the system 20 is designed to accommodate two digit sequences, with one digit sequence being associated with each of the two buttons. The use of two buttons is preferable in certain situations, such as when a new area code is being assigned to an existing local calling area.

When the system 20 is in the operation mode, activating one of the buttons 42 or 44 causes the output signal $V_{output}$ generated by the processor 56 to represent the DTMF signals associated with a selected digit sequence associated with the activated button. The transducer assembly 54 converts the output signal $V_{output}$ into audible DTMF tones corresponding to the selected digit sequence.

Figure 5:
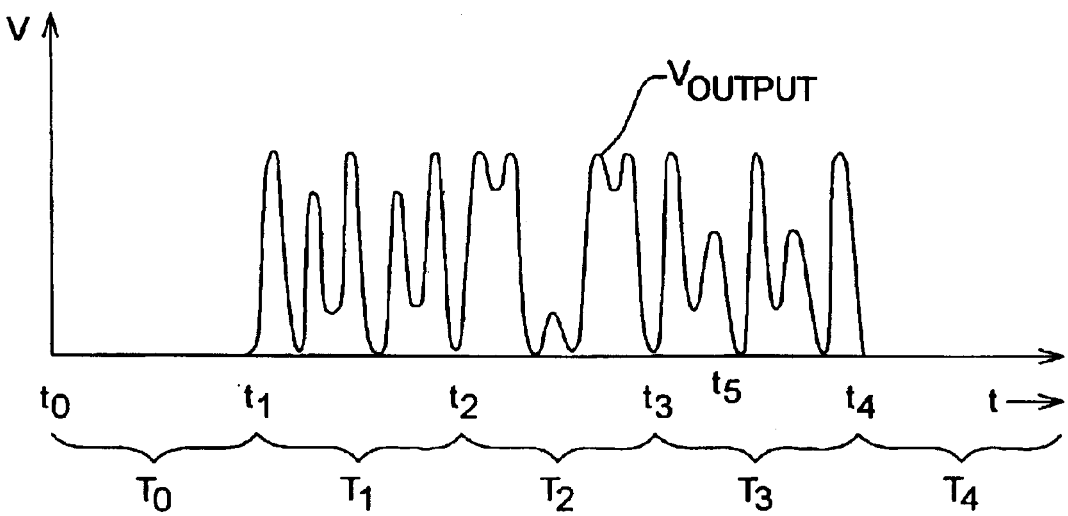
FIG. 5 is a plot depicting an analog output signal produced by the system of the present invention.

More specifically, FIG. 5 contains a graph of the output signal $V_{output}$ for an exemplary three-digit digit sequence. The graph of FIG. 5 plots voltage against time; the waveform represented in FIG. 5 is highly schematic and does not literally represent the actual output signal $V_{output}$. In a time period $T_0$ between times $t_0$ and $t_1$, no button has been pushed, and the output signal $V_{output}$ is zero. At time $t_1$, one of the buttons is activated to select a preset three-digit digit sequence. In a time period $T_1$ between times $t_1$ and $t_2$, the processor 56 generates the output signal $V_{output}$ such that the output signal $V_{output}$ is a DTMF signal representing a first digit of the selected digit sequence. In a time period $T_2$ between times $t_2$ and $t_3$, the processor 56 generates the output signal $V_{output}$ such that the output signal $V_{output}$ is a DTMF signal representing a second digit of the selected digit sequence. In a time period T3 between times $t_3$ and $t_4$, the processor 56 generates the output signal $V_{output}$ such that the output signal $V_{output}$ is a DTMF signal representing a third digit of the selected digit sequence. In a time period $T_4$ after times $t_4$, the generation of the DTMF tones representing the selected digit sequence is complete, and the output signal $V_{output}$ returns to zero.

The durations of the time periods $T_1$, $T_2$, and $T_3$ are sufficient for the telephone switching equipment to recognize the DTMF signal. The durations of the exemplary time periods $T_1$, $T_2$, and $T_3$ are approximately 0.25 to 0.50 seconds in the system 20, but time periods of different durations may be used.

The processor 56 may be selected and configured to generate an analog signal as shown in FIG. 5. However, the ATTINY processor 56 of the tone generating system 20 of the preferred embodiment does not have the capacity to generate an analog signal directly. The exemplary system 20 thus uses a digital pulse-width modulation technique such that a waveform of the output signal $V_{output}$ causes the transducer assembly 54 to create an audible DTMF signal that is recognizable by the telephone network.

The use of the processor 56 and transducer assembly 58 to generate DTMF tones will now be described in further detail. Table A set forth below contains an industry-standard DTMF tone matrix that represents the relationship between frequencies and digits:

TABLE A

| LOW/HIGH | 1209 Hz | 1336 Hz | 1477 Hz | 1633 Hz |
|---|---|---|---|---|
| 697 Hz | 1 | 2 | 3 | A |
| 770 Hz | 4 | 5 | 6 | B |
| 852 Hz | 7 | 8 | 9 | C |
| 941 Hz | * | 9 | # | D |

More specifically, a DTMF signal is a composite signal comprising one of the LOW frequencies and one of the HIGH frequencies. For example, a DTMF signal associated with the digit "2" comprises a first or LOW sine wave having a frequency of 697 Hz and a second or HIGH sine wave having a frequency of 1336 Hz.

To represent analog DTMF signals with digital circuitry, the processor 56 stores sets of frequency data in the form of series of numbers that each represents one of seven of the eight frequencies contained in Table A; the eighth frequency, 1633 Hz, is only used to represent letters and is thus omitted.

In particular, the third through ninth columns in the Table B attached hereto as Exhibit A each contain the series of numbers that represent one of the seven frequencies used to form DTMF signals. The first column contains a sequential sample number from 1 to 78, and the second column contains a number representing time in increments of 55 microseconds.

The numbers in Table B generally correspond to the amplitude of a sine wave having the frequency identified at the top of Table B at a number of points in the cycle of the waveform. A plot or other reproduction of these numbers at the time intervals in the second column will yield a representation of a sine wave of the desired frequency.

All of the number series are repeated for the signal duration of a given DTMF signal; this signal duration corresponds to the durations of the periods $T_1$, $T_2$, and $T_3$ described above. Several of the number sequences are stored several times in Table B to improve reproduction of a composite signal, which is calculated as will be described below. The number of samples reproduced in Table B is set at 78 to show all of the repeated number sequences.

To obtain a composite signal, the numbers in two of the columns of Table B are added to obtain composite data. For example, to create composite data associated with the digit "2", the numbers associated with the frequencies 697 Hz and 1336 Hz are added together for each sample period. For the digit "2", the composite number associated with the first sample is 1+1, or 2. The composite number associated with the tenth sample period is 35+11, or 46. These calculations are repeatedly performed throughout the signal duration, and the repeated series reduce distortions in the resulting composite signal.

The numbers representing the composite data calculated as just described generally correspond to the amplitude of a composite signal comprised of the frequencies 697 Hz and 1336 Hz at a number of points in the cycle of the waveform of the composite signal. A plot or other reproduction of these numbers at the time intervals in the second column will thus yield a representation of a composite signal.

Again, if the processor 56 contains a digital to analog converter, the composite signal could be generated directly from the composite data calculated as described above. For processors like the exemplary processor 56 that do not have the capacity to generate an analog signal, the composite data may be used as a pulse-width modulated signal that represents the analog composite signal.

The present invention implements a digital pulse-width modulation technique as follows. The composite data is stored within the processor 56 in the form of an eight-bit bye, with only least significant six bits being used to represent the composite signal. The use of six significant bits yields 64 possibilities, and the highest numbers in Table B do not add up to a composite number that is greater than 64.

The six significant bits of the composite numbers calculated as described above are used to determine the state of the output signal $V_{output}$ across pins 5 and 6 of the processor 56. In particular, the first bit determines the output voltage $V_{output}$ at cycle 0 of a 64 cycle period. The second bit determines the output voltage $V_{output}$ at cycles 1 and 2 of the 64 cycle period. The third bit determines the output voltage $V_{output}$ at cycles 3–7 of the 64 cycle period. The fourth bit determines the output voltage $V_{output}$ at cycles 8–15 of the 64 cycle period. The fifth bit determines the output voltage $V_{output}$ at cycles 16–31 of the 64 cycle period. The sixth bit determines the output voltage $V_{output}$ at cycles 32–63 of the 64 cycle period.

Figure 6:
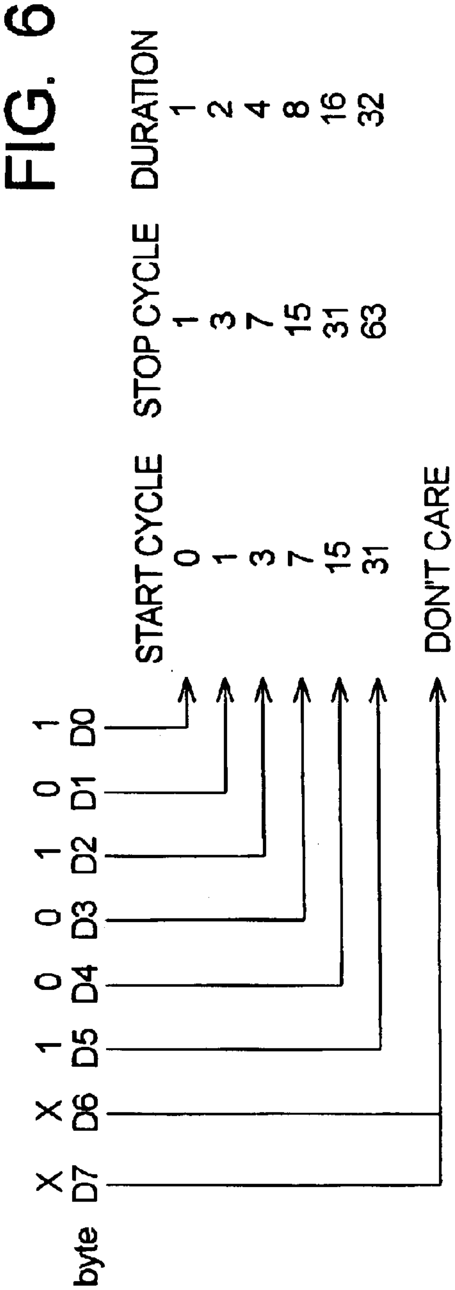
FIG. 6 depicts the relationship of an example of an eight-bit byte and a cycle used to create a pulse-width modulated signal.
Figure 7:
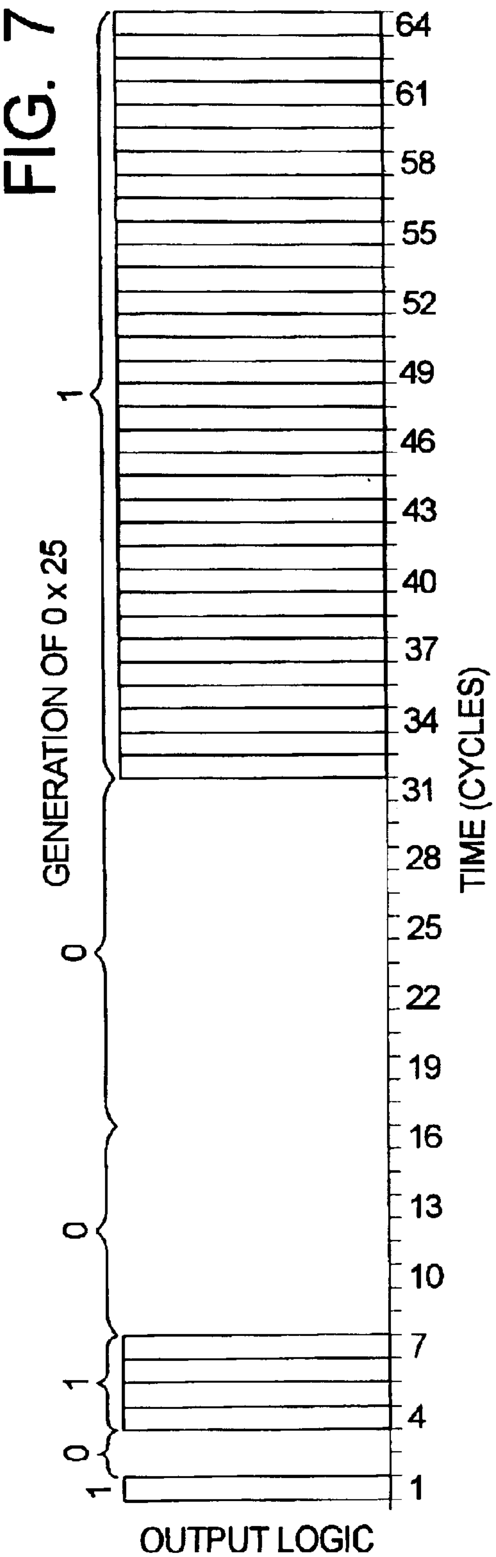
FIG. 7 depicts the pulse-width modulated signal created by the byte depicted in FIG. 6.

An example of this process is depicted in FIGS. 6 and 7. These figures illustrate the generation of the output logic signal given the example of a composite number equaling the hexadecimal number 0×25 (decimal: 37; binary: XX100101). The resulting digital output signal is shown in FIG. 7. The total length of the 64 cycle period is much less than the signal durations $T_1$, $T_2$, and $T_3$ described above.

As generally discussed above, the digital output signal is converted into the output voltage $V_{output}$ across the piezo-electric element 58. In particular, the piezo-electric element 58 is capacitive, and this capacitance, in series with the resistors 62 and 64, acts as a low pass filter that converts the digital output signal into the analog output voltage $V_{output}$.

Accordingly, referring for a moment back to FIG. 5, depicted therein at a sample time $t_s$ is the amplitude of the output voltage $V_{output}$. The time coordinates of FIGS. 5 and 7 are scaled such that the entire 64 cycle period of FIG. 7 occurs at the point $t_s$ in FIG. 5.

More traditional pulse-width modulation techniques could be used to obtain a digital output signal that would be filtered to obtain a suitable analog output voltage $V_{output}$. The system 20 uses the techniques describe herein to minimize instruction cycles on the processor 56 used by the exemplary system 20.

Figure 8:
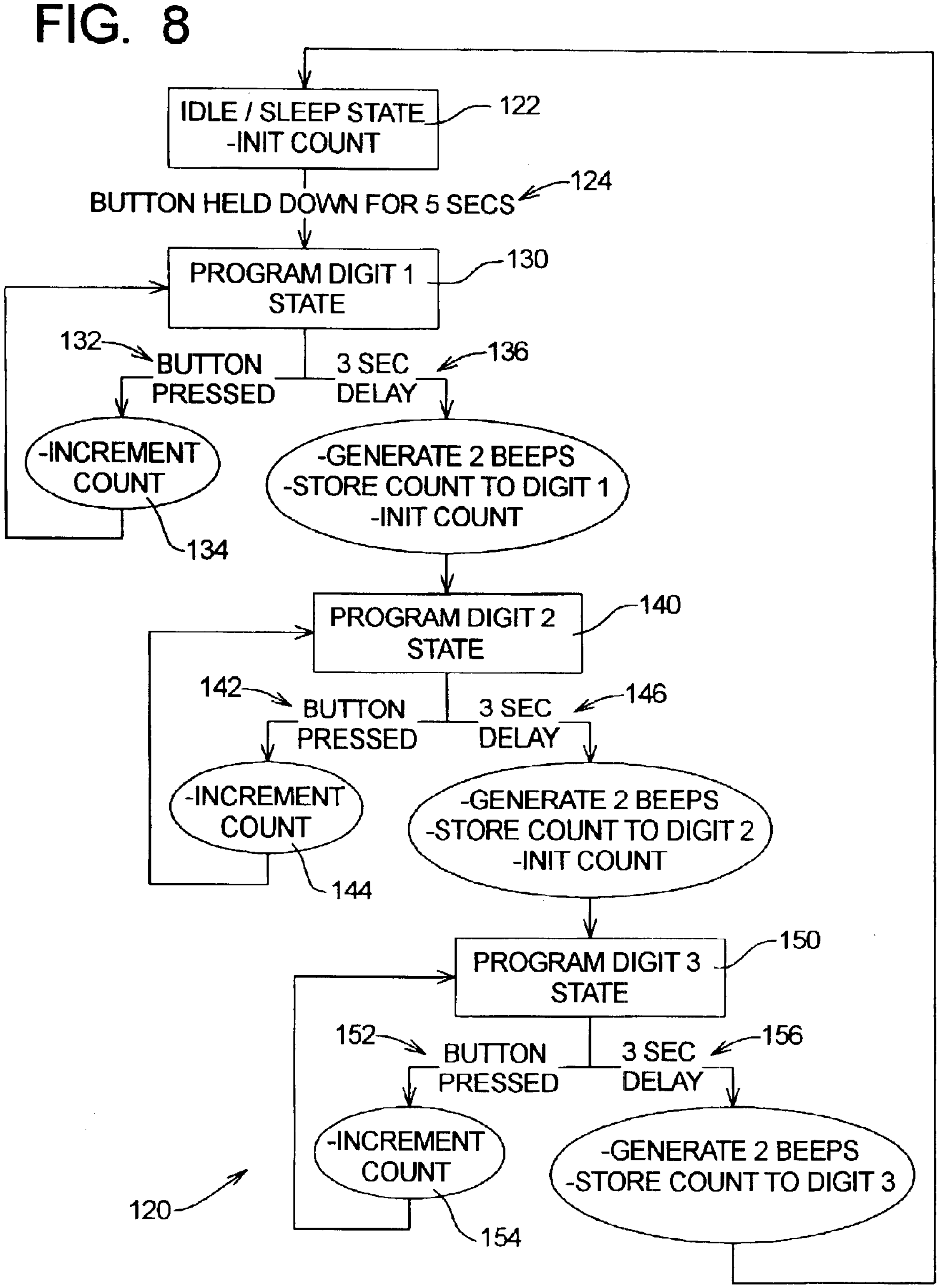
FIG. 8 depicts an example of a first optional programming mode that allows a system using one button to be programmed with a new digit sequence.
Figure 9:
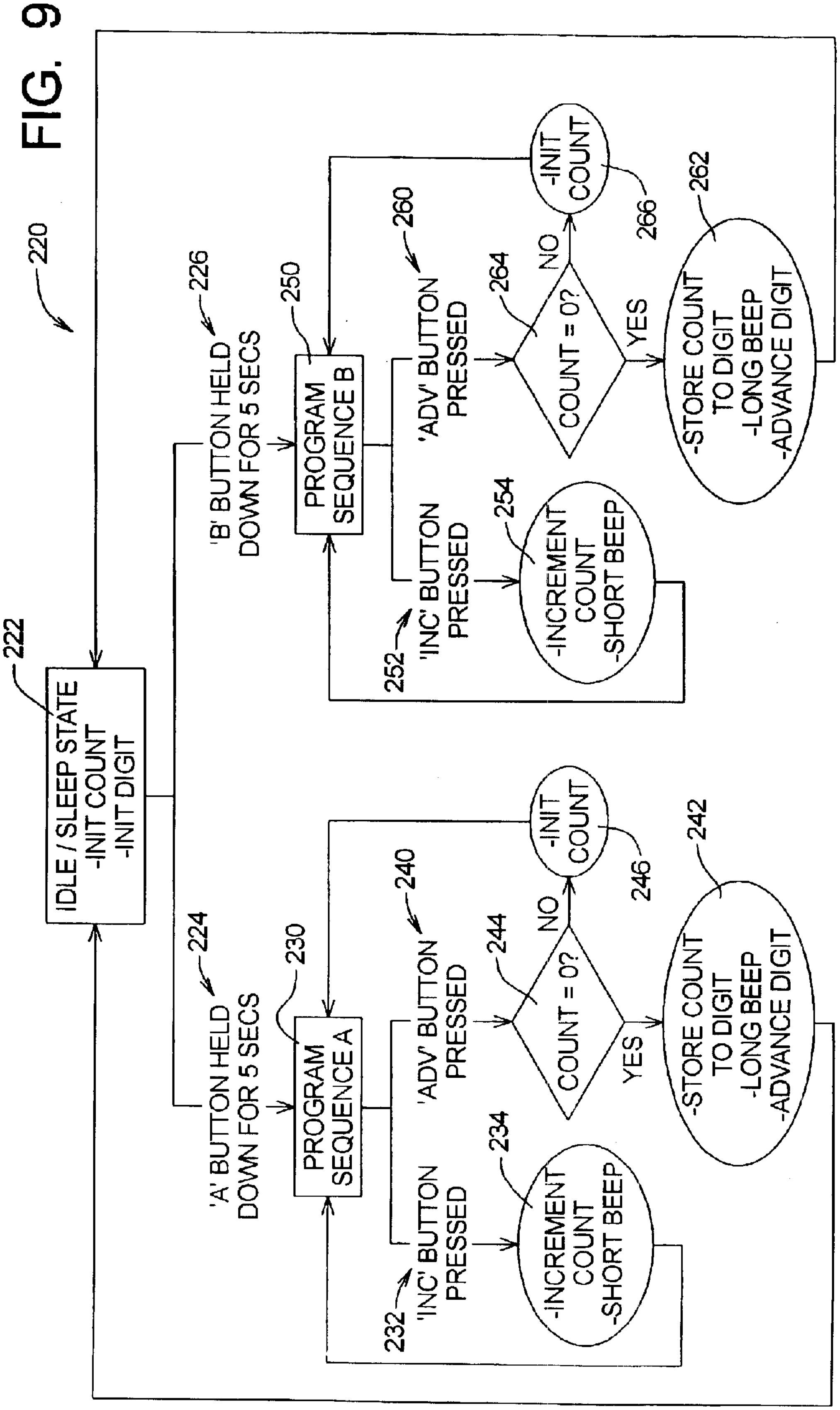
FIG. 9 depicts an example of a second optional programming mode that allows a system using two buttons to be programmed with a new digit sequence.

Referring now to FIGS. 8 and 9, two different examples of programming modes will now be described. As generally described above, the system 20 described above may be implemented with only the button 42 and not the button 44. FIG. 8 illustrates a programming mode 120 that may be implemented by a tone generation system of the present invention having only one button.

An idle/sleep state 122 is depicted at 122 in which the system 20 is waiting for an input on the button 42. If the button 42 is depressed momentarily (less than 5 seconds) as generally described above, the system 20 generates a sequence of DTMF tones based on the digit sequence associated with the button 42 as described above. If, however, a timer function 124 of the system 20 determines that the button 42 is depressed and held for more than five seconds, the system 20 enters the programming state.

A first digit entry step of the programming state is shown at 130. A first digit of a three-digit digit sequence is entered in this first data entry step. The first digit is entered by pressing the button 42 at step 132 and incrementing a counter at step 134. This is repeated until the button 42 has been pressed a number of times corresponding to the value of the first digit. When the number is entered, the user waits for more than three seconds. A timer 136 detects this delay; the system 20 then generates 2 beeps, stores the number in the counter as the first digit, and moves to a second data entry step 140.

The second data entry step detects button presses at 142 and increments a counter 144 to set a second digit of the digit sequence. After a three-second delay 146, the system 20 generates two beeps and moves the third data entry step 150. The third data entry step detects button presses at 152 and increments a counter 154 to set a third digit of the digit sequence. After a three-second delay 156, the system 20 generates two beeps and returns to the idle sleep state 122.

Referring now to FIG. 9, depicted therein is an alternate programming mode 220 for a system containing both of the buttons 42 and 44. As described above, each of these buttons 42 and 44 has an associated digit sequence, and the programming mode 220 allows the digit sequence associated with each of the buttons 42 to be changed.

In particular, an idle/sleep state is shown at 222 in FIG. 9. Again, momentarily pressing one of the two buttons 42 and 44 causes the system to generate a DTMF tone sequence based on the digit sequence corresponding to the depressed button 42 or 44. Pressing either of the buttons 42 or 44 and holding the button for 5 seconds as shown at steps 224 and 226 causes the system to enter the programming mode for the pressed button 42 or 44.

Referring initially to the "A" button, or button 42, a program sequence for the button 42 starts at step 230. Pressing the first button 42 at 232 increments a counter 234; this process is repeated until the button 42 has been pressed the number of times corresponding to a first digit of the digit sequence for the button 42. When the first digit has been entered, the second button is pressed at step 240 to cause the system 20 to store the value of the counter 234 and beep at step 242. Optional steps 244 and 246 check for no button pushes (counter ≠0) and initializes the counter if the button was not pushed.

The process for entering a digit sequence for the "B" button, or button 44, is shown at step 250. Pressing the first button 42 at 252 increments a counter 254. When the button 42 has been pressed the number of times corresponding to a first digit of the digit sequence for the button 44, the second button 42 is pressed at step 260 to cause the system 20 to store the value of the counter 254 and beep at step 262. Optional steps 264 and 266 check for no button pushes (counter ≠0) and initializes the counter if the button was not pushed.

The programming modes 120 and 220 are optional. The system 20 may be fabricated with a predetermined digit sequence for the first button 42 and, if used, the second button 44. In this case, the system 2 may not have a programming mode, and the user will not be able to change the digit sequences associated with the buttons 42 and/or 44.

In addition, the programming modes can easily be altered to accommodate digit sequences of less than or more than three digits. Instead of using delays as at steps 124, 224, and 226 to enter the programming modes 120 and 220, other signals such as quickly depressing the buttons 42 and 44 twice in succession may be used.

Figure 10:
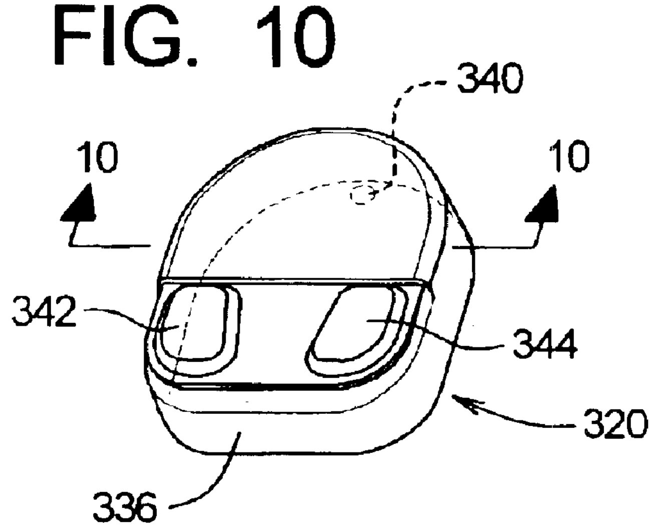
FIG. 10 is a perspective view of another embodiment of a tone generator system of the present invention.
Figure 11:
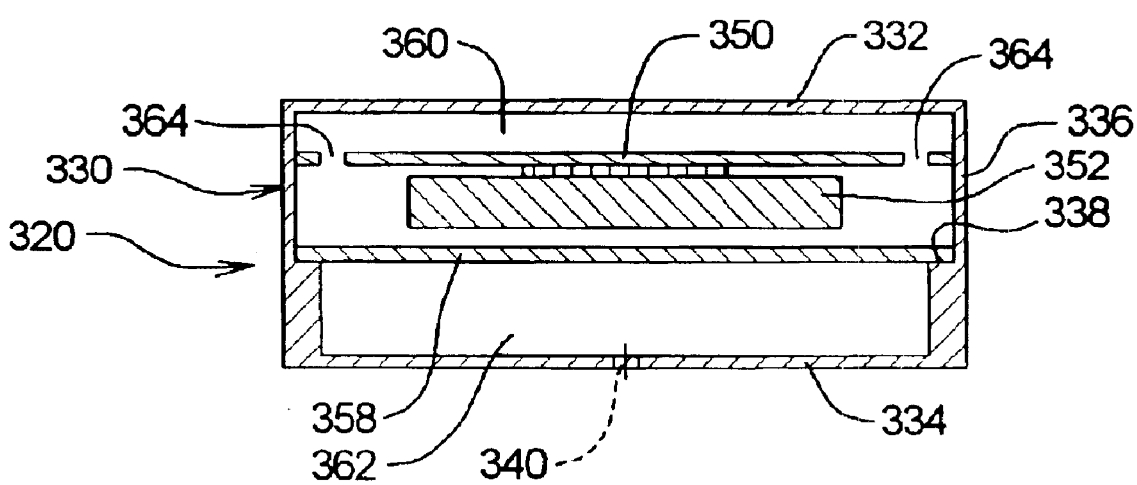
FIG. 11 is a section view taken along lines 11—11 in FIG. 10.

Referring now to FIGS. 10 and 11, yet another exemplary embodiment of a tone generator system constructed in accordance with the present invention is shown at 320 therein. The tone generator system 320 comprises a housing 330 comprising an outer wall 332, an inner wall 334, and a perimeter wall 336. A ledge 338 is formed along at least a portion of the perimeter wall 336 within the housing 330. A sound hole 340 is formed in the housing 330, and first and second buttons 342 and 344 are accessible on the outer wall 332.

FIG. 10 shows that the housing contains a printed circuit board 350 that is supported within the housing 330. A battery is mounted on the printed circuit board 352. In the system 320, a pre-fabricated speaker assembly is not used. Instead, a piezo-electric element 358 is mounted directly on the ledge 338 within the housing 330. The piezo-electric element 358 divides the interior of the housing 330 into upper and lower chambers 360 and 362. The printed circuit board 352 is arranged within the upper chamber 360, and holes 364 are formed in the printed circuit board 364.

The form factor of the system 20 is so small that, without the holes 364, the back pressure created by movement of the piezo-electric element 358 is too large and thus inhibits movement of the element 358. The housing 330, and in particular the size of the upper chamber 360, must be tuned for a particular piezo-electric element 358 to ensure that the element 358 can move or vibrate as necessary to create the DTMF audible tones.

As generally described above, one of ordinary skill in the art will recognize that the system 20 can easily be modified to store one, three, or more digit sequences and/or digit sequences containing fewer or more than three digits. For example, the system 20 may be designed to dial the telephone number of a restaurant, in which case only one digit sequence is stored, and the digit sequence may contain seven or ten digits as necessary to complete the connection to the restaurant. In this case, the system 20 may be given out as a promotional item, and the programming mode may be omitted to prevent the user from changing the number.

Figure 12:
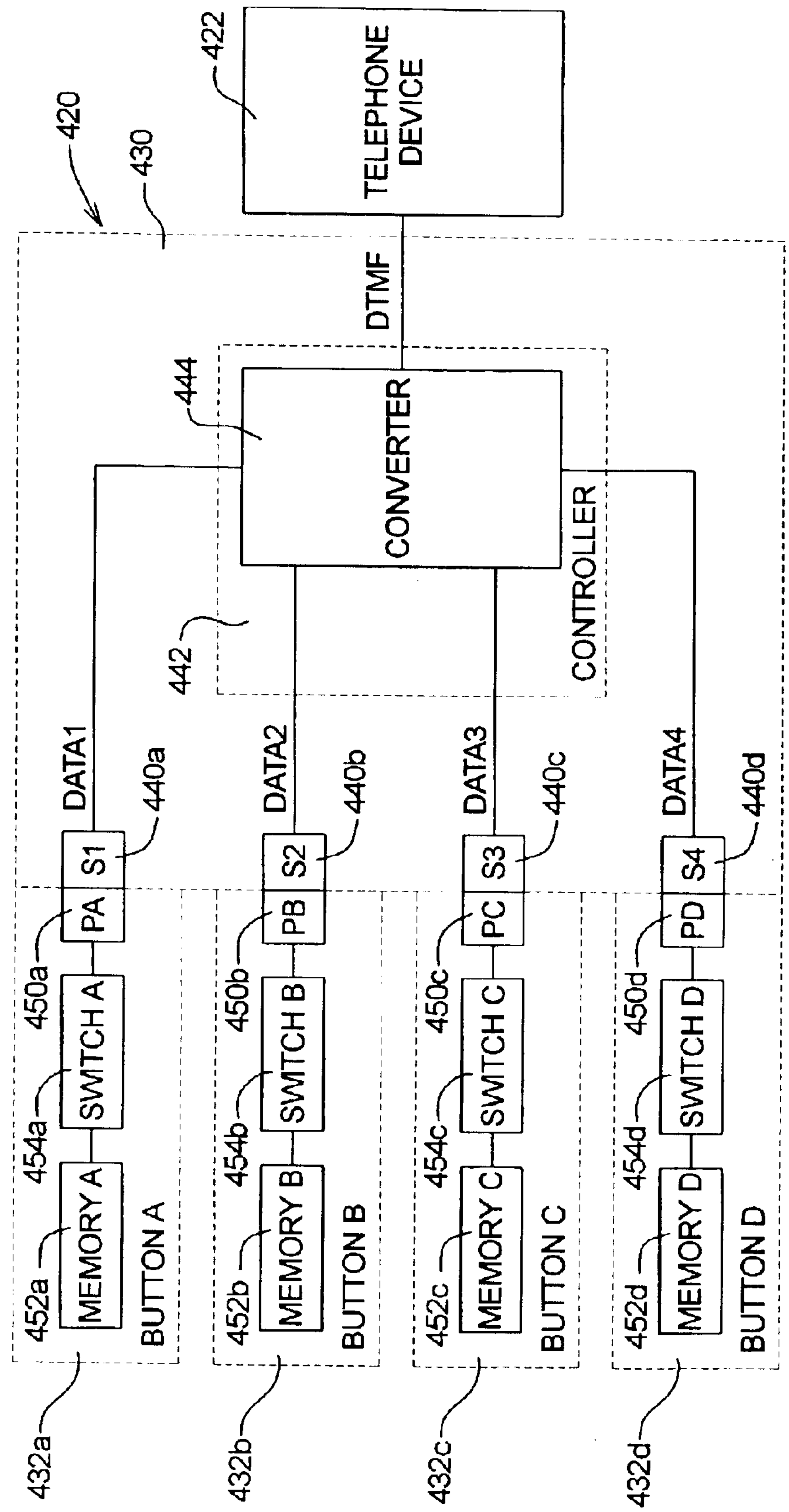
FIG. 12 is a block diagram depicting yet another embodiment of a tone generator system of the present invention.

Reference is now made to FIG. 12, where another exemplary tone generator system 420 is depicted. The tone generator system 420 is similar in use and purpose to the tone generator systems 20 and 320 described above. However, the tone generator system 420 does not create audible tones; instead, the system 420 directly applies an electric DTMF signal to a telephone device 422. In addition, the tone generator system 420 comprises a socket assembly 430 for receiving one or more button assemblies 432. Each button assembly is associated with a pre-programmed sequence of numbers that can be converted to a DTMF signal containing a sequence of DTMF tones corresponding to the pre-programmed sequence of numbers.

FIG. 12 illustrates that the socket assembly 430 comprises a plurality of sockets 440 and a controller 442 defining a converter 444. The button assemblies 432 each comprise a plug 450, a memory device 452, and a switch element 454.

The sockets 440 receive the plugs 450 to form an electrical coupling between the electrical components of the button assemblies 432 and the controller 442. The sockets 440 also mechanically engage the plugs 450 to detachably attach the button assemblies 432 onto the socket assembly 430. Any number of conventional electrical connector systems can be used to form the sockets 440 and plugs 450.

The controller 442 can be any hardware or combination of hardware and software capable of converting the sequence of numbers stored in the memory devices 452 into a DTMF signal that is compatible with conventional telephony networks.

Figure 13:
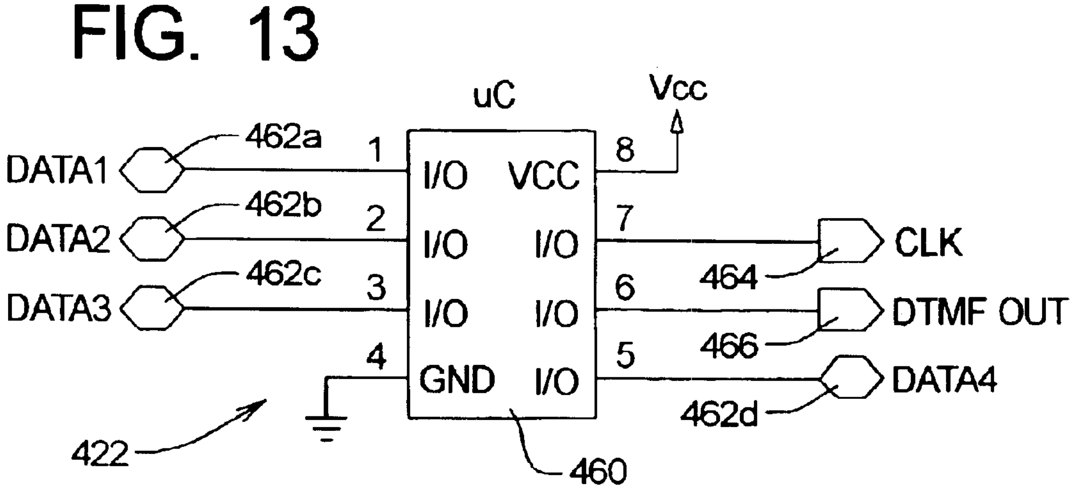
FIG. 13 is a circuit diagram depicting a controller portion of the tone generator system of FIG. 12.

Referring now to FIG. 13, depicted therein is a processor 460 that may be used as the controller 442. The processor 460 is an eight-pin device that contains six I/O ports. The processor 460 contains memory, a clock, and a CPU capable of processing instructions.

Four of the I/O ports are configured as input ports **462*a*, 462*b*, 462*c*, and 462*d* that receive serial binary data signals DATA1, DATA2, DATA3, and DATA4. One of the I/O ports is configured as a clock port 464 at which a clock signal CLK is present. The last of the I/O ports is configured as an output port 466 at which a DTMF OUT signal is present The exemplary processor 460 further contains software capable of implementing the process described above with reference to FIGS. 4–7. In particular, the processor 460** generates the DTMF OUT signal as a pulse-width modulated signal corresponding to conventional DTMF tones. When the DTMF OUT signal is passed through a low pass filter, an analog voltage signal is created that generates DTMF signals recognizable by conventional telephony equipment. Other systems and methods may be used to generate the analog DTMF signal, however.

Figure 14:
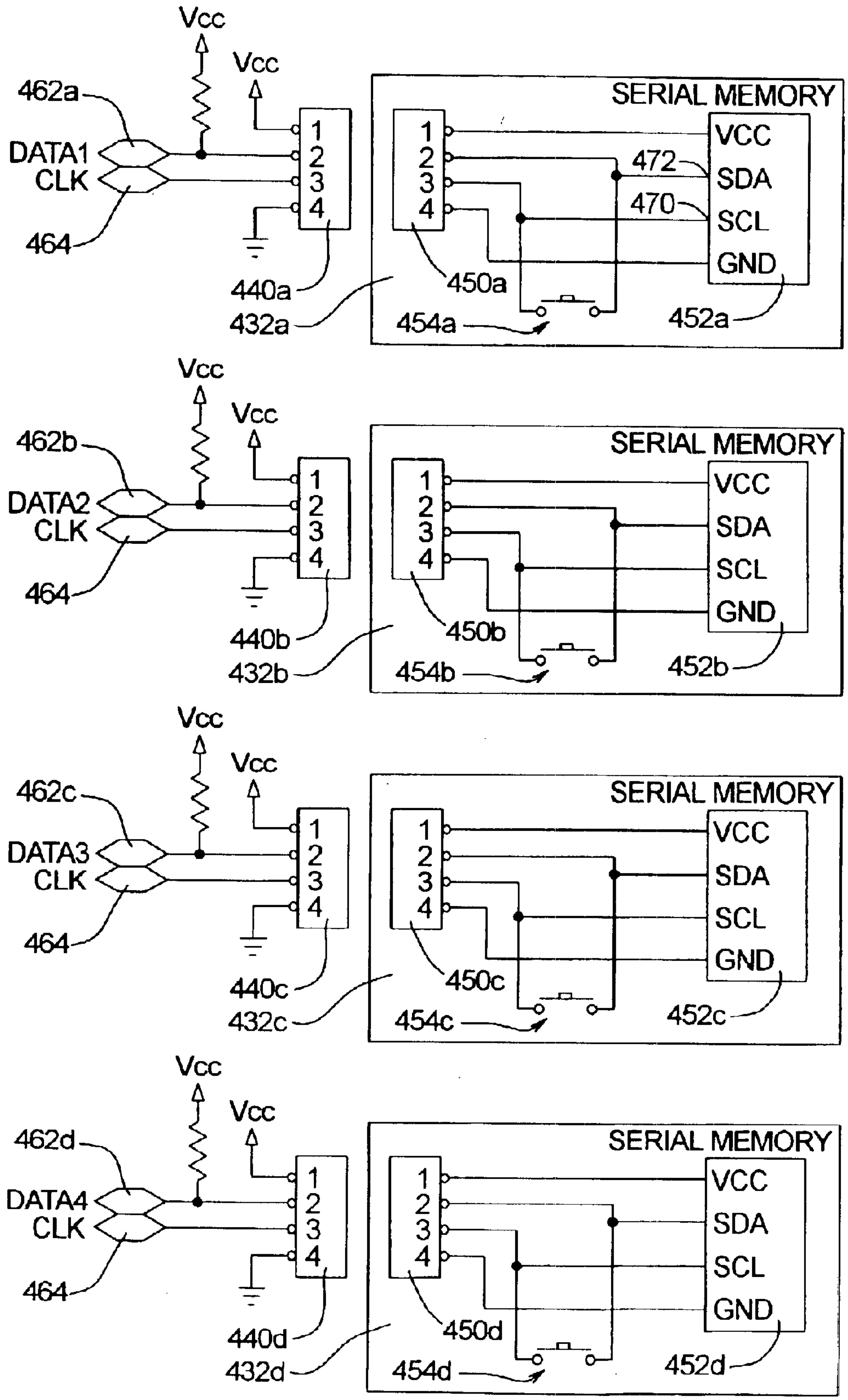
FIG. 14 is a circuit diagram depicting button portions of the tone generator system of FIG. 12.

Reference is now made to FIG. 14, which depicts details of construction and operation of the exemplary button assemblies 432. The sockets 440 and plugs 450 are shown as four-pin connectors that-carry power to the memory devices 452. These connectors further connect a clock input port 470 of the memory device 452 to the clock port 464 of the processor 460 and a serial data access port 472 of the memory devices 452 to one of the data ports 462 of the processor 460. Each of the data ports **462*a*, 462*b*, 462*c*, and 462*d* is associated with a corresponding one of the sockets 440*a*, 440*b*, 440*c*, and 440*d***.

The switch devices 454 are normally open momentary switches and may be conventional elastomer or membrane switches. When actuated, the switch devices 454 trigger an interrupt at the corresponding data port 462 of the processor 460. When the interrupt is generated, the processor 460 reads data from the serial data access port 472 and parses this data to determine the sequence of numbers stored by the memory device 452. The processor 460 then generates the DTMF OUT signal based on the sequence of numbers read from the memory device 452.

Figure 15:
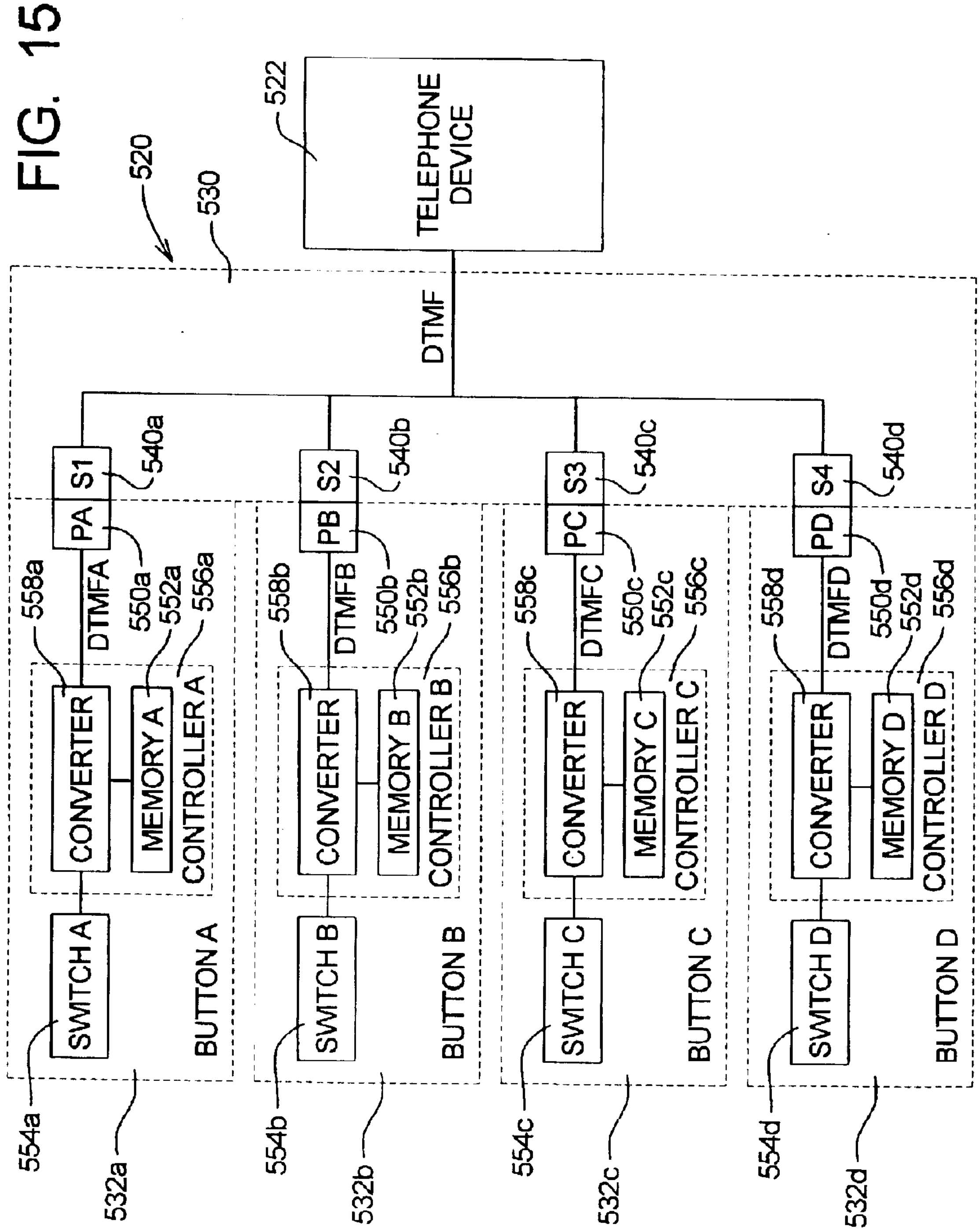
FIG. 15 is a block diagram depicting yet another embodiment of a tone generator system of the present invention.

Referring now to FIG. 15, where yet another exemplary tone generator system 520 is depicted. The tone generator system 520 is similar in use and purpose to the tone generator systems 20, 320, and 420 described above. However, like the tone generator system 420, the tone generator system 520 does not create audible tones but instead applies an electric DTMF signal to a telephone device 522. In addition, the tone generator system 520 also comprises a socket assembly 530 for receiving one or more button assemblies 532 each of which is associated with a pre-programmed sequence of numbers that can be converted to a DTMF signal.

FIG. 15 illustrates that the socket assembly 530 comprises a plurality of sockets 540. Unlike the socket assembly 430 described above, the socket assembly 530 does not contain a controller. The button assemblies 532 each comprise, in addition to a plug 550, a memory device 552, and a switch element 554, a controller 556 defining a converter 558.

The sockets 540 receive the plugs 550 to form an electrical coupling between the electrical components of the button assemblies 532 and the telephone device 522. The sockets 5440 also mechanically engage the plugs 550 to detachably attach the button assemblies 532 onto the socket assembly 530. Any number of conventional electrical connector systems can be used to form the sockets 540 and plugs 550.

Figure 16:
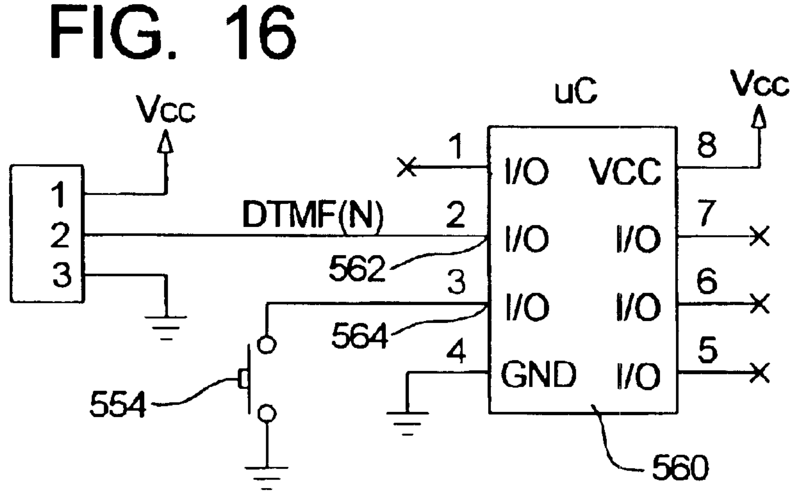
FIG. 16 is a circuit diagram depicting an exemplary button portion of the tone generator system of FIG. 15.

The controller 556 can be any hardware or combination of hardware and software capable of converting the sequence of numbers stored in the memory devices 552 into a DTMF signal that is compatible with conventional telephony networks. More specifically, as shown in FIG. 16, the controller 556 may be implemented using a processor 560. The processor 560 is an eight-pin device containing six I/O ports. The processor 560 contains memory, a clock, and a CPU capable of processing instructions. One of the I/O ports is configured as an output port 562 at which a DTMF OUT signal is present. Another of the I/O ports is configured as an interrupt port 564 and is connected to the switch device 554.

The exemplary processor 560 further contains software capable of implementing the process described above with reference to FIGS. 4–7. In particular, the processor 460 generates the DTMF OUT signal as a pulse-width modulated signal corresponding to conventional DTMF tones. When the DTMF OUT signal is passed through a low pass filter, an analog voltage signal is created that generates DTMF signals recognizable by conventional telephony equipment. Other systems and methods may be used to generate the analog DTMF signal, however. In the system 520, the sockets 540 and plugs 550 are three-pin connectors that carry power to the processor 560 and the DTMF OUT signal through the socket assembly 530 and to the telephone device 522.

Each of the button assemblies 532 thus contains a dedicated processor 560. However, the number sequence associated with each of the button assemblies 532 may be stored in the internal memory space of the processor 560, so a separate, discrete memory device is not required.

The switch devices 554 are normally open momentary switches and may be conventional elastomer or membrane switches. When actuated, the switch devices 554 trigger an interrupt at the interrupt port 564 of the corresponding processor 460. When the interrupt is generated, the processor 460 generates the DTMF OUT signal based on the sequence of numbers read from the memory device 552 within the processor 560.

The system 520 can, as configured, contain any number of sockets 440 and button assemblies 432. Using the eight-pin processor 460, the system 420 is limited to four sockets 440 and button assemblies 432. However, the use of a processor having a greater number of I/O ports would increase the number of sockets and button assemblies that can be accommodated by the system 420.

Figure 17:
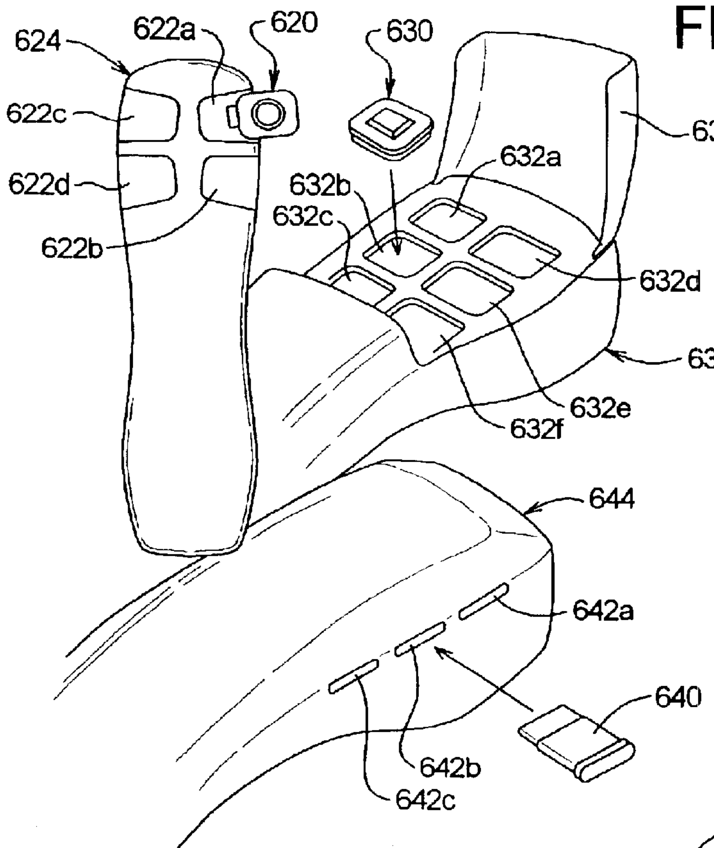
FIG. 17 contains three perspective views depicting exemplary mechanical systems for integrating the tone generator systems of FIGS. 12 and 15 into a handset of a telephone device.

Referring now to FIG. 17, shown therein is a button assembly 620 designed to be received by sockets 622 formed in a telephone handset 624. FIG. 17 also shows a button 630 being placed in sockets 632 in the shape of cubes that are hidden by a cover 634 rotatably attached to a telephone handset 636. FIG. 17 further shows a button assembly 640 that is inserted into sockets 642 in the shape of elongate slots along two sides of a telephone handset 644.

Figure 18:
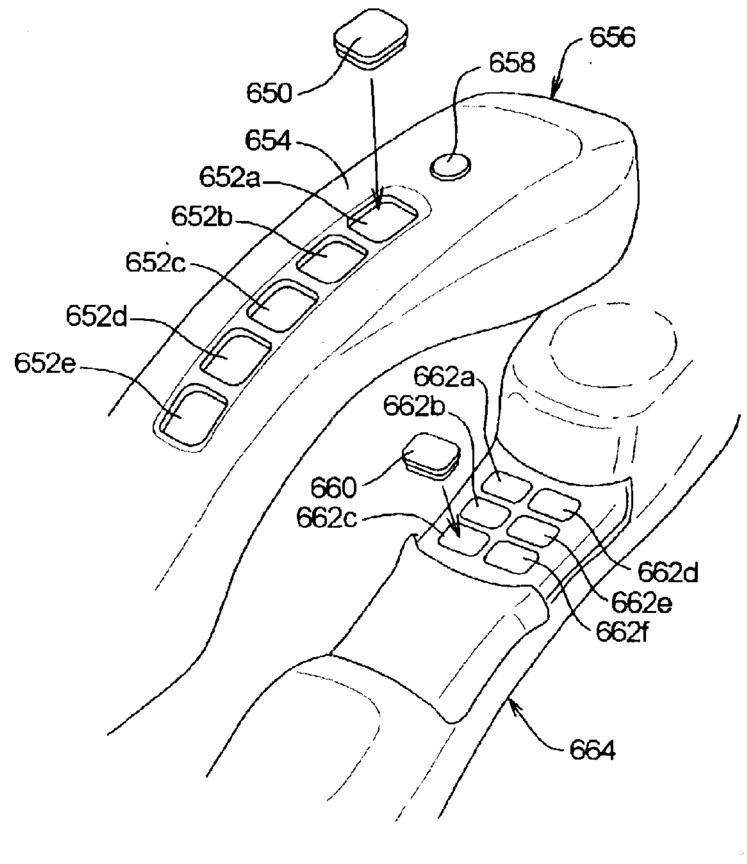
FIG. 18 contains two perspective views depicting exemplary mechanical systems for integrating the tone generator systems of FIGS. 12 and 15 into a handset of a telephone device.

FIG. 18 shows a button assembly 650 that is inserted into a socket 652 in the form of an elongate slot along a back surface 654 of a telephone handset 656. A security button 658 must also be pressed to enable the button assemblies 650. Button assemblies 660 in FIG. 18 are designed to be received by sockets 662 formed in a rectangular array on the handset 664. A slide cover 666 covers the array of sockets 662.

Figure 19:
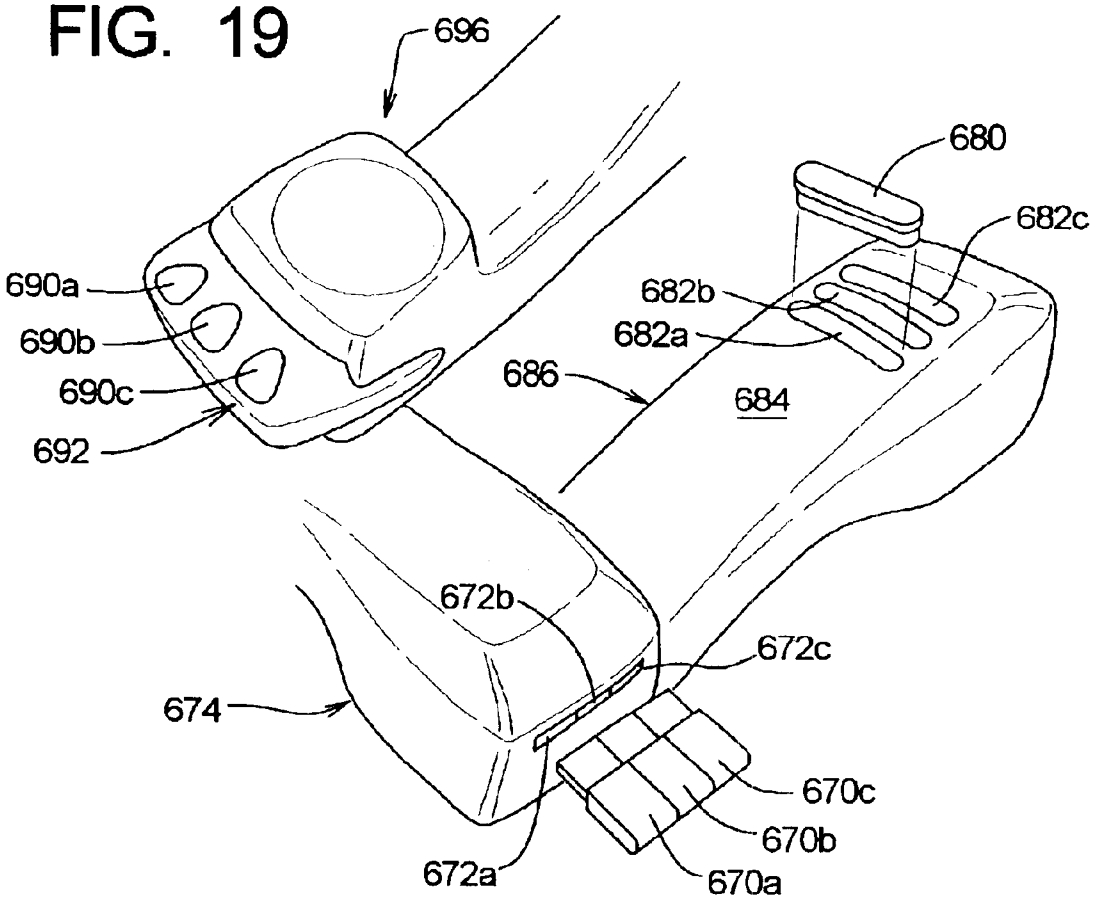
FIG. 19 contains two perspective views depicting exemplary mechanical systems for integrating the tone generator systems of FIGS. 12 and 15 into a handset of a telephone device.

Referring now to FIG. 19, button assemblies 670 shown therein are received in sockets 672 formed by slots in the end of a handset 674. FIG. 19 also shows button assemblies 680 that are received in sockets 682 formed as elongate slots in a back surface 684 of a telephone handset 686. Button assemblies 690 are formed in a socket assembly 692 that is attached to an end of a telephone handset 696.

Figure 20:
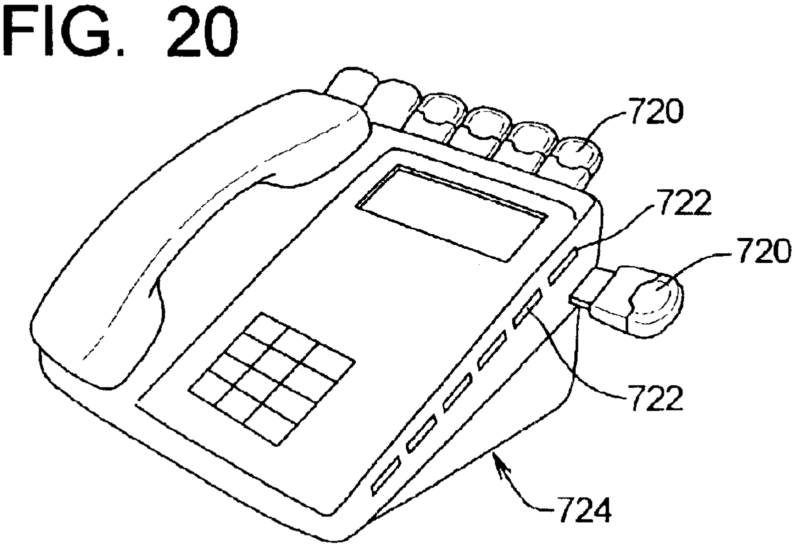
FIG. 20 contains a perspective view depicting an exemplary mechanical system for integrating the tone generator systems of FIGS. 12 and 15 into a base of a telephone device.

FIG. 20 illustrates buttons 720 that are received by sockets 722 formed in a telephone base 724.

What is claimed is:

1. A system for generating number tones for dialing a telephone device comprising:

a first housing associated with the telephone device;

a socket assembly defining at least one socket, where
- the socket assembly is supported by the first housing and
- the socket is electrically connected to the telephone device;

a first memory device for storing a sequence of numbers;

a first data entry device associated with the first memory device;

a converter for generating an electrical DTMF signal comprising a sequence of DTMF tones;

a plug electrically connected to the converter; and a second housing for supporting the first memory device, the first data entry device, the converter, and the plug; whereby socket assembly receives the second housing such that the plug engages the socket to electrically connect the converter to the telephone device;

operation of the switch device causes the converter to generate the electrical DTMF signal based on the sequence of numbers stored by the memory device; and the electrical DTMF signal is transmitted to the telephone device through the plug and the socket.

2. A system as recited in claim 1, further comprising:

an activation system that detects activation of the first data entry device to place the system in a programming mode; and a programming system that allows the first sequence of stored digits to be changed when the system is in the programming mode.

3. A system as recited in claim 2, in which the programming system comprises a counter for counting activations of the first data entry device in a first group of activations, where the number of activations in the first group of activations is stored in the first memory device as a first portion of the first sequence of stored digits.

4. A system as recited in claim 2, in which the first sequence of stored digits comprises a plurality of numbers, the system further comprising a counter for counting activations of the first data entry device in a plurality of groups of activations, where the number of activations in each of the plurality of groups of activations are stored in the first memory device as one of the numbers of the first sequence of stored digits.

5. A system as recited in claim 4, further comprising:

a timer for measuring a delay period during which the first data entry device is not activated; whereby the number of activations in each of the plurality of groups of activations are stored in the first memory device as one of the numbers of the first sequence of stored digits based on the delay period.

6. A system as recited in claim 1, further comprising a second memory device that stores first and second sets of frequency data, where each set of frequency data represents a sine wave signal having a predetermined frequency.

7. A system as recited in claim 6, further comprising a summing system that adds the first and second sets of frequency data to obtain composite data, where the composite data represents a composite signal comprising first and second sine wave signals associated with the first and second sets of frequency data.

8. A system as recited in claim 7, in which the converter comprises a pulse-width modulator for generating the electrical DTMF signal based on the composite data.

9. A system as recited in claim 8, in which the converter generates the electrical DTMF signal based on a binary representation of the composite data.

10. A system as recited in claim 9, in which binary representation of the composite data generally corresponds to a value of the composite signal at a given point in time.

11. A system as recited in claim 10, in which the converter generates the electrical DTMF signal as a HI or LOW signal based on the value of the bits forming binary numbers of the composite data.

12. A system as recited in claim 1, in which the electrical DTMF signal is a pulse-width modulated signal, the system further comprising a filtering circuit that filters the pulse-width modulated electrical DTMF signal such that the electrical DTMF signal is a composite signal comprising first and second sine wave signals, where the frequencies of the first and second sine wave signals are associated with the numbers of the first sequence of stored digits.

13. A system as recited in claim 1, in which the converter generates the electrical DTMF signal based on a binary representation of the composite data.

* * * * *